United States Patent
Huss et al.

(10) Patent No.: US 6,408,898 B1
(45) Date of Patent: Jun. 25, 2002

(54) OIL RECOVERY DEVICE

(76) Inventors: Edward S. Huss; Pamela J. Huss, both of 6500 Gurd Rd. P.O. Box A, Hastings, MI (US) 49058

( * ) Notice: Subject to any disclaimer, the term of this patent is extended or adjusted under 35 U.S.C. 154(b) by 0 days.

(21) Appl. No.: 09/944,025

(22) Filed: Sep. 1, 2001

(51) Int. Cl.$^7$ ................................. B65B 1/04
(52) U.S. Cl. ..................... 141/106; 141/86; 141/364; 184/106
(58) Field of Search .................. 141/86, 106, 105, 141/331, 332, 333, 340, 341, 342, 364, 311 A; 184/106; D15/150; 211/85.25, 74

(56) References Cited

U.S. PATENT DOCUMENTS

| | | | | |
|---|---|---|---|---|
| 418,738 A | * | 1/1890 | Mowll ..................... 141/332 |
| 430,084 A | * | 6/1890 | Paine ....................... 211/74 |
| 447,643 A | * | 3/1891 | Kersey ..................... 141/106 |
| 478,303 A | * | 7/1892 | Allgood .................... 141/106 |
| 578,671 A | * | 3/1897 | Wisdom .................... 141/106 |
| 2,133,770 A | * | 10/1938 | McGlohon ................. 141/104 |
| 2,191,488 A | * | 2/1940 | McCowan .................. 100/102 |
| 2,369,982 A | * | 2/1945 | Richards .................... 141/106 |
| 2,591,526 A | * | 4/1952 | Fales, Sr. et al. ........... 141/106 |
| 2,600,770 A | * | 6/1952 | Hofacer .................... 141/106 |
| 2,643,030 A | * | 6/1953 | Lyon ........................ 141/106 |
| 2,654,508 A | * | 10/1953 | Wright ..................... 141/106 |
| 2,774,393 A | * | 12/1956 | Swan ........................ 141/100 |
| 2,781,065 A | * | 2/1957 | Hofacer .................... 141/106 |
| 3,933,275 A | * | 1/1976 | Metzner et al. .............. 211/74 |
| 4,408,642 A | * | 10/1983 | Jeruzal et al. .............. 144/286.5 |
| 4,832,095 A | | 5/1989 | Bonnell |
| 5,080,150 A | | 1/1992 | Deadwyler |
| 5,269,354 A | | 12/1993 | Koberg |
| 5,325,898 A | * | 7/1994 | Forgnone ................... 141/106 |
| 5,477,897 A | | 12/1995 | Scofield |
| 5,540,264 A | * | 7/1996 | Harp ........................ 141/106 |
| 5,636,670 A | | 6/1997 | Baker |
| D389,381 S | | 1/1998 | Smith |
| D412,713 S | * | 8/1999 | Hill ......................... D15/150 |
| 6,129,219 A | * | 10/2000 | Peickert .................... 211/74 |

* cited by examiner

*Primary Examiner*—Steven O. Douglas
*Assistant Examiner*—Khoa Huynh

(57) ABSTRACT

An oil recovery device for removing oil lining the interior of oil containers. The oil recovery device includes a housing having a front wall having a plurality of openings therein. Each of the openings has a drawer therein hingedly coupled to the front wall. Each of the drawers has a plurality of compartments therein. Each of the base walls has a pipe attached thereto. The pipes are in communication with the compartments of the attached drawer. A tube is fluidly coupled to the housing and extends into the bottom wall. Each of a plurality of oil containers may be positioned in one of the compartments such that oil within the oil containers may be drained into the pipes. The oil may then be removed from the housing through the tube.

9 Claims, 3 Drawing Sheets

OIL RECOVERY DEVICE

BACKGROUND OF THE INVENTION

1. Field of the Invention

The present invention relates to oil recovery devices and more particularly pertains to a new oil recovery device for removing oil lining the interior of oil containers.

2. Description of the Prior Art

The use of oil recovery devices is known in the prior art. More specifically, oil recovery devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,477,897; 4,832,095; 5,636,670; U.S. Des. Pat. No. 389,381; U.S. Pat. Nos. 5,080,150; and 5,269,354.

While these devices fulfill their respective, particular objectives and requirements, the aforementioned patents do not disclose a new oil recovery device. The inventive device includes a housing having a bottom wall, a back wall, a top wall, a front wall, a first side wall, and a second side wall. The front wall has a plurality of elongate openings therein extending between the first and second side walls. Each of the openings has a generally rectangular shape such that each of the openings has a bottom edge. A plurality of drawers each has a base wall, a facing wall, a rear wall, and a pair of lateral side walls. The drawers have a plurality of compartments therein. The drawers are each positioned in one of the openings. Each of the facing walls has a bottom edge hingedly coupled to and extending along one of the bottom edge of the associated opening such that each of the rear walls may be abutted against the back wall of the housing when the drawer is in a closed position. Each of the base walls has a pipe attached thereto. The pipes are in communication with the compartments of the attached drawer. A tube is fluidly coupled to the housing and extends into the bottom wall. Each of a plurality of oil containers may be positioned in one of the compartments such that oil within the oil containers may be drained into the pipes. The oil may then be removed from the housing through the tube.

In these respects, the oil recovery device according to the present invention substantially departs from the conventional concepts and designs of the prior art, and in so doing provides an apparatus primarily developed for the purpose of removing oil lining the interior of oil containers.

SUMMARY OF THE INVENTION

In view of the foregoing disadvantages inherent in the known types of oil recovery devices now present in the prior art, the present invention provides a new oil recovery device construction wherein the same can be utilized for removing oil lining the interior of oil containers.

The general purpose of the present invention, which will be described subsequently in greater detail, is to provide a new oil recovery device apparatus and method which has many of the advantages of the oil recovery devices mentioned heretofore and many novel features that result in a new oil recovery device which is not anticipated, rendered obvious, suggested, or even implied by any of the prior art oil recovery devices, either alone or in any combination thereof.

To attain this, the present invention generally comprises a housing having a bottom wall, a back wall, a top wall, a front wall, a first side wall, and a second side wall. The front wall has a plurality of elongate openings therein extending between the first and second side walls. Each of the openings has a generally rectangular shape such that each of the openings has a bottom edge. A plurality of drawers each has a base wall, a facing wall, a rear wall, and a pair of lateral side walls. The drawers have a plurality of compartments therein. The drawers are each positioned in one of the openings. Each of the facing walls has a bottom edge hingedly coupled to and extending along one of the bottom edge of the associated opening such that each of the rear walls may be abutted against the back wall of the housing when the drawer is in a closed position. Each of the base walls has pipe attached thereto. The pipes are in communication with the compartments of the attached drawer. A tube is fluidly coupled to the housing and extends into the bottom wall. Each of a plurality of oil containers may be positioned in one of the compartments such that oil within the oil containers may be drained into the pipes. The oil may then be removed from the housing through the tube.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new oil recovery device apparatus and method which has many of the advantages of the oil recovery devices mentioned heretofore and many novel features that result in a new oil recovery device which is not anticipated, rendered obvious, suggested, or even implied by any of the prior art oil recovery devices, either alone or in any combination thereof.

It is another object of the present invention to provide a new oil recovery device which may be easily and efficiently manufactured and marketed.

It is a further object of the present invention to provide a new oil recovery device which is of a durable and reliable construction.

An even further object of the present invention is to provide a new oil recovery device which is susceptible of a low cost of manufacture with regard to both materials and labor, and which accordingly is then susceptible of low prices of sale to the consuming public, thereby making such oil recovery device economically available to the buying public.

Still yet another object of the present invention is to provide a new oil recovery device which provides in the apparatuses and methods of the prior art some of the advantages thereof, while simultaneously overcoming some of the disadvantages normally associated therewith.

Still another object of the present invention is to provide a new oil recovery device for removing oil lining the interior of oil containers.

Yet another object of the present invention is to provide a new oil recovery device which includes a housing having a bottom wall, a back wall, a top wall, a front wall, a first side wall, and a second side wall. The front wall has a plurality of elongate openings therein extending between the first and second side walls. Each of the openings has a generally rectangular shape such that each of the openings has a bottom edge. A plurality of drawers each has a base wall, a facing wall, a rear wall, and a pair of lateral side walls. The drawers have a plurality of compartments therein. The drawers are each positioned in one of the openings. Each of the facing walls has a bottom edge hingedly coupled to and extending along one of the bottom edge of the associated opening such that each of the rear walls may be abutted against the back wall of the housing when the drawer is in a closed position. Each of the base walls has pipe attached thereto. The pipes are in communication with the compartments of the attached drawer. A tube is fluidly coupled to the housing and extends into the bottom wall. Each of a plurality of oil containers may be positioned in one of the compartments such that oil within the oil containers may be drained into the pipes. The oil may then be removed from the housing through the tube.

Still yet another object of the present invention is to provide a new oil recovery device that holds a plurality of oil containers at one time for efficient removal of oil from the oil containers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
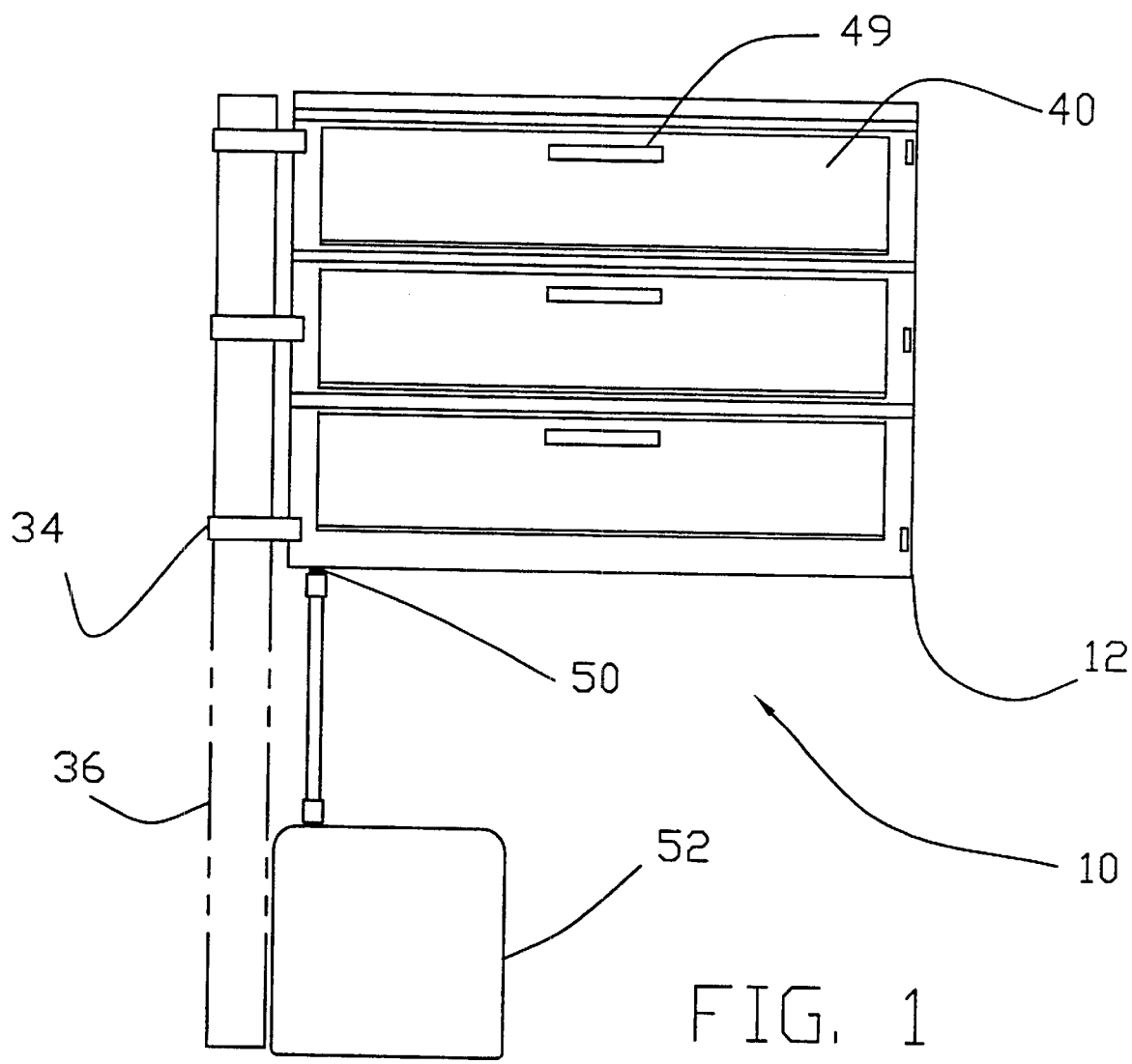
FIG. 1 is a schematic front view of a new oil recovery device according to the present invention.
Figure 2:
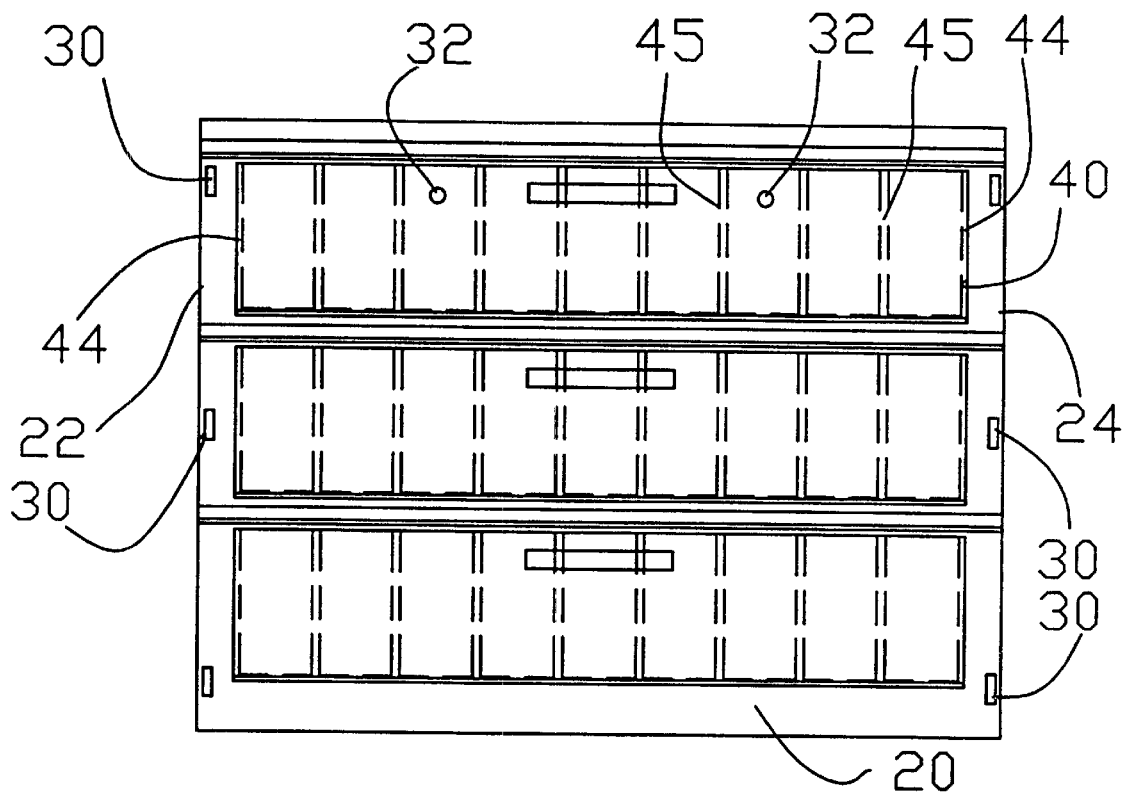
FIG. 2 is a schematic front view of the present invention.
Figure 3:
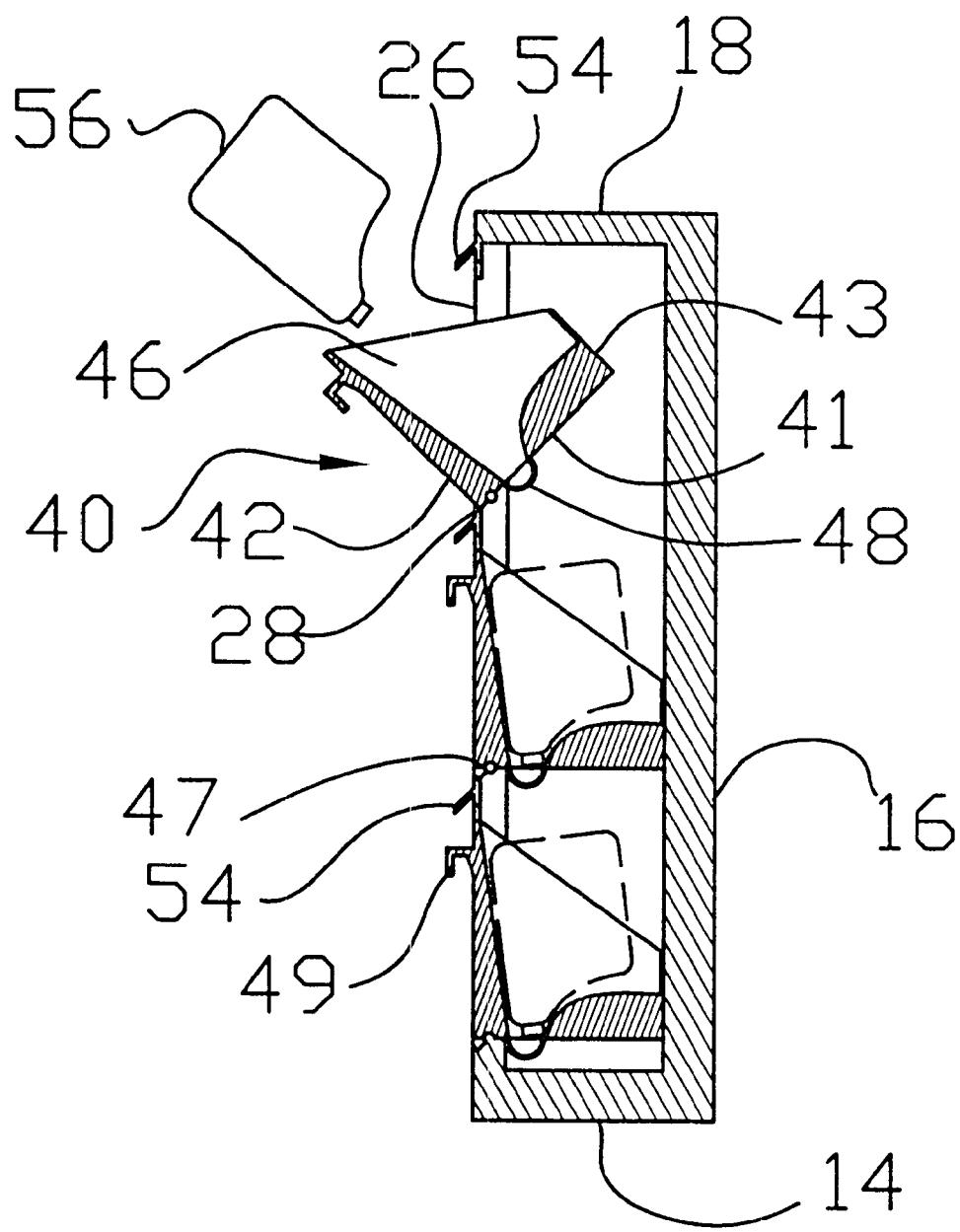
FIG. 3 is a schematic cross-sectional side view of the present invention.

With reference now to the drawings, and in particular to FIGS. 1 through 3 thereof, a new oil recovery device embodying the principles and concepts of the present invention and generally designated by the reference numeral 10 will be described.

As best illustrated in FIGS. 1 through 3, the oil recovery device 10 generally comprises a housing 12 having a bottom wall 14, a back wall 16, a top wall 18, a front wall 20, a first side wall 22, and a second side wall 24. The front wall 20 has a plurality of elongate openings 26 therein extending between the first 22 and second 24 side walls. Each of the openings 26 has a generally rectangular shape such that each of the openings has a bottom edge 28. A plurality of slots 30 extends through the front 20 and back walls 16. The slots 30 are aligned between the top 18 and bottom 14 walls and are positioned adjacent to the first side wall 22. Slots 30 may also be positioned adjacent to the second side walls 24. The back wall 16 has a plurality of apertures 32 therein positioned nearer the top wall than the bottom wall 14. The slots 30 may be used for straps 34 to hold the housing 12 up against a pole 36. The apertures 32 may be used for receiving conventional mechanical fasteners for mounting the housing 12 on a wall.

Each of a plurality of drawers 40 has a base wall 41, a facing wall 42, a rear wall 43, and a pair of lateral side walls 44. Each of the drawers 40 has a plurality of intermediate walls 45 therein extending between the facing 42 and rear 43 walls such that a plurality of compartments 46 are defined in each of the drawers 40. Each of the drawers 40 is positioned in one of the openings 26. The facing walls 42 each have a bottom edge 47 hingedly coupled to and extending along one of the bottom edges 28 of the associated opening 26 such that each of the rear walls 43 may be abutted against the back wall 16 of the housing 12 when the drawer 40 is in a closed position. The facing walls 42 have a height greater than a corresponding rear wall 43. Each of the base walls 41 has a pipe 48 attached thereto. The pipes 48 are positioned nearer the facing walls 42 than the rear walls 43. The pipes 48 are in communication with the compartments 46 of the attached drawer 40. Each of the compartments 46 is sloped toward the associated pipe 48 when the drawers 40 are placed in the closed position. The pipes 48 are each angled downward from the second side wall 24 toward the first side wall 22 at an angle preferably equal to about 2 degrees. Each of the drawers 40 preferably has a handle 49 attached thereto.

A tube 50 is fluidly coupled to the housing 12 and extends into the bottom wall 14. The tube 50 is used for draining the housing into a container 52.

Each of a plurality of rain guards 54 comprises a panel attached to the front wall 20 and extending over one of the openings 26 in the housing.

Smaller versions, for residential use may be configures having only one opening 26 and one drawer 40, or the overall size of the device may be reduced such that there are fewer compartments 46. Commercial versions of the device 10 would typically be larger and contain multiple drawers 40 each having many compartments 46.

In use, each of a plurality of conventional oil containers 56 may be positioned in one of the compartments 46 such that oil within the oil containers 56 may be drained into the pipes 48. The oil may be removed from the housing 12 through the tube 50. This method removes oil which does not immediately drain from the oil containers 56 when the oil is poured from the oil containers and into an engine.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An oil recovery system for recovering residual oil from an oil container, said system comprising:
    a housing having a bottom wall, a back wall, a top wall, a front wall, a first side wall, and a second side wall, said front wall having an elongate opening therein extending between said first and second side walls, said opening having a generally rectangular shape such that said opening has a bottom edge;
    a drawer having a base wall, a facing wall, a rear wall, and a pair of lateral side walls, said drawer having a plurality of compartments therein, said drawer being positioned in said opening, said facing wall having a bottom edge hingedly coupled to and extending along the bottom edge of the opening such that said rear wall abutted against said back wall of said housing when said drawer is in a closed position, said base wall having a pipe attached thereto, said pipe being in communication with said compartments of the attached drawer;
    a tube being fluidly coupled to said housing and extending into said bottom wall; and
    wherein each of a plurality of oil containers is positioned in one of the compartments such that oil within the oil containers is drained into said pipe, wherein the oil is removed from said housing through said tube.

2. An oil recovery system for recovering residual oil from an oil container, said system comprising:
    a housing having a bottom wall, a back wall, a top wall, a front wall, a first side wall, and a second side wall, said front wall having a plurality of elongate openings therein extending between said first and second side walls, each of said openings having a generally rectangular shape such that each of said openings has a bottom edge;
    a plurality of drawers each having a base wall, a facing wall, a rear wall, and a pair of lateral side walls, each of said drawers having a plurality of compartments therein, each of said drawers being positioned in one of said openings, each of said facing walls having a bottom edge hingedly coupled to and extending along one of the bottom edge of the associated opening such that each of said rear walls abutted against said back wall of said housing when said drawer is in a closed position, each of said base walls having a pipe attached thereto, said pipes being in communication with said compartments of the attached drawer;
    a tube being fluidly coupled to said housing and extending into said bottom wall; and
    wherein each of a plurality of oil containers is positioned in one of the compartments such that oil within the oil containers is drained into said pipes, wherein the oil is removed from said housing through said tube.

3. Then oil recovery system as in claim 2, wherein a plurality of slots extend through said front and back walls, said slots being aligned between said top and bottom walls and being positioned adjacent to said first side wall.

4. Then oil recovery system as in claim 2, wherein said back wall has a plurality of apertures therein, said apertures being positioned generally nearer said top wall than said bottom wall.

5. Then oil recovery system as in claim 2, wherein each of said facing walls has a height greater than a corresponding rear wall.

6. Then oil recovery system as in claim 2, wherein each of said compartments is sloped toward the pipe when said drawers are placed in said closed position.

7. Then oil recovery system as in claim 2, wherein each of said pipes is angled downward from said second side wall toward said first side wall.

8. Then oil recovery system as in claim 2, further comprising a plurality of rain guards each comprising a panel attached to said front wall and extending over one of said openings in said housing.

9. An oil recovery system for recovering residual oil from an oil container, said system comprising:
    a housing having a bottom wall, a back wall, a top wall, a front wall, a first side wall, and a second side wall, said front wall having a plurality of elongate openings therein extending between said first and second side walls, each of said openings having a generally rectangular shape such that each of said openings has a bottom edge, a plurality of slots extend through said front and back walls, said slots being aligned between said top and bottom walls and being positioned adjacent to said first side wall, said back wall having a plurality of apertures therein positioned nearer said top wall than said bottom wall;
    a plurality of drawers each having a base wall, a facing wall, a rear wall, and a pair of lateral side walls, each of said drawers having a plurality of intermediate walls therein extending between said facing and rear walls such that a plurality of compartments are defined in each of said drawers, each of said drawers being positioned in one of said openings, each of said facing walls having a bottom edge hingedly coupled to and extending along one of the bottom edge of the associated opening such that each of said rear walls abutted against said back wall of said housing when said drawer is in a closed position, each of said facing walls having a height greater than a corresponding rear wall, each of said base walls having a pipe attached thereto, each of said pipes being positioned nearer said facing wall than said rear wall, said pipes being in communication with said compartments of the attached drawer, each of said compartments being sloped toward the pipe when said drawers are placed in said closed position, each of said pipes being angled downward from said second side wall toward said first side wall;
    a tube being fluidly coupled to said housing and extending into said bottom wall;
    a plurality of rain guards each comprising a panel attached to said front wall and extending over one of said openings in said housing; and
    wherein each of a plurality of oil containers is positioned in one of the compartments such that oil within the oil containers is drained into said pipes, wherein the oil is removed from said housing through said tube.

* * * * *